(12) United States Patent
Mori et al.

(10) Patent No.: US 8,900,351 B2
(45) Date of Patent: Dec. 2, 2014

(54) FILTER MEDIUM AND METHOD OF MANUFACTURING THE SAME AND FILTER UNIT

(75) Inventors: Masaaki Mori, Osaka (JP); Masatoshi Suzuki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 264 days.

(21) Appl. No.: 12/742,625

(22) PCT Filed: Nov. 11, 2008

(86) PCT No.: PCT/JP2008/070499
§ 371 (c)(1),
(2), (4) Date: May 12, 2010

(87) PCT Pub. No.: WO2009/063861
PCT Pub. Date: May 22, 2009

(65) Prior Publication Data
US 2010/0269464 A1    Oct. 28, 2010

(30) Foreign Application Priority Data
Nov. 14, 2007  (JP) ................................. 2007-295815

(51) Int. Cl.
*B01D 53/22* (2006.01)
*B01D 39/16* (2006.01)

(52) U.S. Cl.
CPC .... *B01D 39/1692* (2013.01); *B01D 2239/0654* (2013.01)
USPC ..................... 96/11; 96/4; 96/7; 96/12; 96/13

(58) Field of Classification Search
CPC ..... B01D 53/228; B01D 71/022; C01B 3/505
USPC ................................................. 96/4, 7, 11–13
See application file for complete search history.

(56) References Cited

U.S. PATENT DOCUMENTS

| | | | | |
|---|---|---|---|---|
| 3,266,223 A | * | 8/1966 | Dresser et al. | 96/13 |
| 3,695,967 A | * | 10/1972 | Rose | 156/209 |
| 4,668,258 A | * | 5/1987 | Steer | 96/12 |
| 4,808,467 A | * | 2/1989 | Suskind et al. | 442/384 |
| 4,907,536 A | * | 3/1990 | Chrisler | 119/419 |
| 4,950,531 A | * | 8/1990 | Radwanski et al. | 442/351 |

(Continued)

FOREIGN PATENT DOCUMENTS

| | | |
|---|---|---|
| EP | 0 391 660 | 10/1990 |
| EP | 0 576 343 | 12/1993 |

(Continued)

*Primary Examiner* — Jason M Greene
*Assistant Examiner* — Anthony Shumate
(74) *Attorney, Agent, or Firm* — Hamre, Schumann, Mueller & Larson, P.C.

(57) ABSTRACT

Provided is a filter medium including a porous polytetrafluoroethylene (PTFE) membrane and a gas-permeable supporting member that are integrated to ensure sufficient stiffness, having excellent gas permeability, and providing excellent bonding between respective layers included in the filter medium. The gas-permeable supporting member includes: a substrate having gas-permeability; and a fiber layer that is placed on the substrate so as to be in contact with the porous PTFE membrane. The gas-permeable supporting member has a structure in which fibers of the fiber layer enter into the substrate and are entangled with the substrate so that the fiber layer is bonded to the substrate. The fiber layer contains polyolefin-containing fibers that are bonded to the porous membrane.

18 Claims, 6 Drawing Sheets

(56) References Cited

U.S. PATENT DOCUMENTS

| | | | | |
|---|---|---|---|---|
| 5,759,594 A * | 6/1998 | Masui et al. | ............... | 425/510 |
| 5,908,524 A * | 6/1999 | Masui et al. | ............... | 156/212 |
| 6,110,249 A * | 8/2000 | Medcalf et al. | ............... | 55/514 |
| 6,372,004 B1 | 4/2002 | Schultink et al. | | |
| 6,554,881 B1 | 4/2003 | Healey | | |
| 7,820,568 B2 * | 10/2010 | Horiguchi et al. | ............... | 442/268 |
| 2002/0166449 A1 | 11/2002 | Scanlon | | |
| 2002/0170434 A1 * | 11/2002 | Kawano et al. | ............... | 96/11 |
| 2003/0010210 A1 | 1/2003 | Kawano et al. | | |
| 2005/0172812 A1 * | 8/2005 | Ueda et al. | ............... | 96/67 |
| 2009/0130371 A1 * | 5/2009 | Horiguchi et al. | ............... | 428/91 |
| 2012/0053547 A1 * | 3/2012 | Schroeder et al. | ............... | 604/369 |

FOREIGN PATENT DOCUMENTS

| | | |
|---|---|---|
| EP | 1 240 935 | 9/2002 |
| EP | 1 266 681 | 12/2002 |
| EP | 1 674 144 | 6/2006 |
| EP | 2 213 356 | 8/2010 |
| JP | 9-021055 | 1/1997 |
| JP | 11-080397 | 3/1999 |
| JP | 2002-370020 A | 12/2002 |
| JP | 2005-253711 A | 9/2005 |
| JP | 2005-279555 A | 10/2005 |
| JP | 2006-081779 A | 3/2006 |
| JP | 2006-083496 A | 3/2006 |
| JP | 2006-083497 A | 3/2006 |
| JP | 2006-291404 | 10/2006 |
| JP | 2007-075739 A | 3/2007 |
| JP | 2007-098356 A | 4/2007 |
| WO | 96/04063 | 2/1996 |
| WO | 03/015893 | 2/2003 |

\* cited by examiner

FILTER MEDIUM AND METHOD OF MANUFACTURING THE SAME AND FILTER UNIT

TECHNICAL FIELD

The present invention relates to a filter medium including a porous polytetrafluoroethylene (PTFE) membrane and a method of manufacturing the same, and to a filter unit.

BACKGROUND ART

Filters for high performance cyclone vacuum cleaners, etc. are required to have high collection efficiency. Generally, for such filters, filter media including porous PTFE membranes, filter media obtained by adding binders to glass fibers and forming the mixtures into paper sheets (glass filter media), and filter media obtained by converting meltblown nonwoven fabrics into electret materials (electret filter media) are used. Filter media including porous PTFE membranes, among them, rarely suffer from problems such as the production of fibrils and self-dusting and have a smaller increase in the pressure drop during the use thereof. Because of these advantages, these filter media are expected to be used increasingly.

In a filter through which a large amount of air passes, such as a filter for a vacuum cleaner, the filter medium itself is required to have a certain degree of stiffness to prevent the filter from being deformed by the passing air. In a filter including a porous PTFE membrane, the porous PTFE membrane can be integrated with a gas-permeable supporting member for supporting the porous membrane to increase the stiffness of the filter medium to a level high enough to ensure sufficient stiffness. A wide variety of materials having better gas-permeability than the porous PTFE membrane can be used for the gas-permeable supporting member. Generally, materials such as nonwoven fabrics and meshes are used.

In order to ensure the gas-permeability of the filter medium and increase the stiffness thereof, for example, a nonwoven fabric of a polyester typified by polyethylene terephthalate (PET) may be used as the gas-permeable supporting member. JP 2005-253711 A discloses that a porous PTFE membrane and a polyester nonwoven fabric that is a gas-permeable supporting member may be integrated to form a filter medium.

PTFE, however, has poor adhesion to polyester, particularly PET. Therefore, in order to integrate the porous PTFE membrane directly with the PET nonwoven fabric that is a gas-permeable supporting member, heat lamination needs to be carried out at high temperature and high pressure. This type of lamination may cause clogging of the nonwoven fabric due to such high heat, which results easily in a significant decrease in the gas-permeability of the filter medium. Generally, PTFE has poor adhesion not only to PET but also to materials other than PET. Therefore, the same problems occur even when a gas-permeable supporting member made of a material other than a PET nonwoven fabric is used.

As a solution to these problems, a method can be employed in which a polyethylene (PE) nonwoven fabric having relatively good adhesion to PTFE is disposed as an adhesive layer between the porous PTFE membrane and the PET nonwoven fabric and these layers are bonded to each other by heat lamination. In this method, the lamination can be carried out at a lower temperature than the direct heat lamination of the porous PTFE membrane and the PET nonwoven fabric. As a result, a decrease in the gas-permeability of the filter medium caused by the clogging thereof can be inhibited. However, the bonding strength between the PET nonwoven fabric, which is a gas-permeable supporting member, and the PE nonwoven fabric, which is an adhesive layer, is not necessarily high. This causes problems such as peeling of the adhesive layer from the gas-permeable supporting member.

The combined use of an adhesive or a hot-melt agent is a good solution to improve the bonding between the gas-permeable supporting member and the adhesive layer. The combined use thereof, however, causes problems such as a decrease in the gas-permeability caused by clogging, a decrease in the yield caused by an increase in the number of manufacturing processes, and an occurrence of outgassing of the adhesive during the heat lamination.

In order to impart liquid repellency, such as water repellency or oil repellency, to the filter medium, the gas-permeable supporting member commonly is subjected to liquid repellent treatment. This liquid repellent treatment further decreases the bonding strength between the porous PTFE membrane and the gas-permeable supporting member.

SUMMARY OF THE INVENTION

In view of the above, it is an object of the present invention to provide a filter medium including a porous PTFE membrane and a gas-permeable supporting member that are integrated to ensure sufficient stiffness, having excellent gas-permeability, and providing excellent bonding between respective layers included in the filter medium, and a method of manufacturing such a filter medium, and to provide a filter unit including the filter medium.

A filter medium of the present invention is a filter medium including: a porous polytetrafluoroethylene (PTFE) membrane; and a gas-permeable supporting member for supporting the porous membrane. The porous membrane and the gas-permeable supporting member are integrated. The gas-permeable supporting member includes: a substrate having gas-permeability; and a fiber layer that is placed on the substrate so as to be in contact with the porous membrane. The gas-permeable supporting member has a structure in which fibers of the fiber layer enter into the substrate and are entangled with the substrate so that the fiber layer is bonded to the substrate. The fiber layer contains polyolefin-containing fibers that are bonded to the porous membrane.

A filter unit of the present invention includes the above-described filter medium of the present invention; and a supporting frame for supporting the filter medium.

A filter medium manufacturing method of the present invention is a method of manufacturing the above-described filter medium of the present invention. The method includes integrating a porous PTFE membrane and a gas-permeable supporting member including a substrate and a fiber layer placed on the substrate so that the porous PTFE membrane and the fiber layer are in contact with each other. The substrate has gas-permeability, and the fiber layer contains polyolefin-containing fibers that are exposed thereon. The gas-permeable supporting member has a structure in which fibers of the fiber layer enter into the substrate and are entangled with the substrate so that the fiber layer is bonded to the substrate.

In the filter medium of the present invention, the gas-permeable supporting member including the substrate and the fiber layer that is placed on the substrate so as to be in contact with the porous PTFE membrane is used. This gas-permeable supporting member has a structure in which the fibers of the fiber layer enter into the substrate and are entangled with the substrate so that the fiber layer is bonded to the substrate. The fiber layer contains polyolefin-containing fibers, and these fibers are bonded to the porous PTFE membrane.

The integration of the porous PTFE membrane and the gas-permeable supporting member in this filter medium allows the filter medium to have the stiffness required as a filter medium. In addition, the substrate and the fiber layer that constitute the gas-permeable supporting member are bonded to each other by the mechanical force generated by entanglement of fibers, and fibers containing polyolefin (polyolefin-containing fibers), which exhibits relatively good adhesion to PTFE generally having poor adhesion to others, are bonded to the porous PTFE membrane. Therefore, the resulting filter medium provides excellent bonding between respective layers included in the filter medium and has high reliability. Furthermore, this filter medium can be manufactured without the constituent members of the filter medium being exposed to an excessively high temperature. Therefore, the resulting filter medium is imparted with excellent gas permeability, in which clogging of the porous PTFE membrane and the gas-permeable supporting member are suppressed.

According to the manufacturing method of the present invention, the filter medium as described above can be manufactured reliably and efficiently.

DETAILED DESCRIPTION OF THE INVENTION

In the following description, the same reference numerals are used to designate the same elements and parts, and overlapping description thereof may be omitted.

Figure 1:
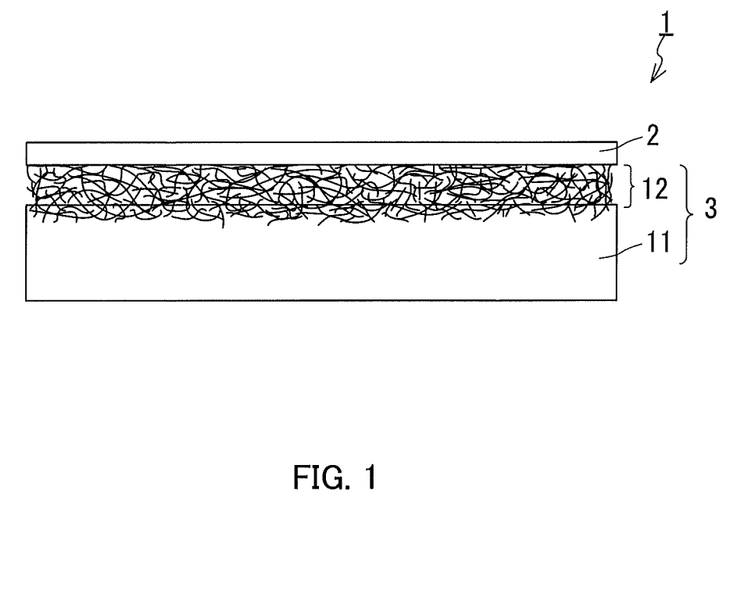
FIG. 1 is a schematic diagram showing an example of a filter medium of the present invention.

FIG. 1 shows an example of a filter medium of the present invention. A filter medium 1 shown in FIG. 1 has a structure in which a porous PTFE membrane 2 and a gas-permeable supporting member 3 for supporting the porous membrane 2 are integrated. The gas-permeable supporting member 3 has a substrate 11 having gas-permeability and a fiber layer 12 that is placed on the substrate 11 so as to be in contact with the porous membrane 2. The gas-permeable supporting member 3 has a structure in which fibers of the fiber layer 12 enter into the substrate 11 and are entangled with the substrate 11 so that the fiber layer 12 is bonded to the substrate 11. The fiber layer 12 contains polyolefin-containing fibers that are bonded to the porous membrane 2.

In the filter medium 1, the gas-permeable supporting member 3 is disposed so that the fiber layer 12 containing the polyolefin-containing fibers is in contact with the porous PTFE membrane 2. The relatively good adhesion of the fiber layer 12 to PTFE allows the fiber layer 12 to achieve good bonding with the porous PTFE membrane 2. In addition, the fiber layer 12 and the substrate 11 are bonded to each other by mechanical force generated by entanglement of the fibers contained in the fiber layer 12. Therefore, high bonding strength is ensured between the fiber layer 12 and the substrate 11. That is, the filter medium 1 provides excellent bonding between respective layers included in the filter medium and has high reliability.

In the process of manufacturing the filter medium 1, the placement of the fiber layer 12 allows the gas-permeable supporting member 3 and the porous PTFE membrane 2 to be bonded with each other under more moderate conditions than those of direct heat lamination of the substrate 11 (for example, a nonwoven fabric of PET) and the porous PTFE membrane 2. That is, the clogging of the porous PTFE membrane 2 and the gas-permeable supporting member 3 are suppressed, and therefore the resulting filter medium has excellent gas-permeability.

The substrate 11 is not particularly limited as long as it has gas-permeability, that is, it has void spaces through which gases pass. For example, various types of porous materials such as nonwoven fabrics, nets, meshes (network nets) can be used. Preferably, the substrate 11 is a nonwoven fabric. In this case, the balance among the stiffness, strength, flexibility and handling of the filter medium 1 improves. It is preferable that the gas-permeability of the substrate 11 be higher than that of the porous PTFE membrane 2. The pressure drop of the substrate 11 (pressure drop obtained when air passes through the substrate at a flow rate of 5.3 cm/sec) is, for example, 100 Pa or less, and preferably 50 Pa or less.

The material used for the substrate 11 is not particularly limited. Various kinds of metals or fibers can be used. Preferably, the substrate 11 contains polyester fibers, and particularly preferably, it contains polyethylene terephthalate (PET) fibers. In this case, the balance among the strength, flexibility, heat resistance and handling of the filter medium 1 improves. In addition, heat lamination to be described later can be performed efficiently.

The substrate 11 containing polyester fibers, particularly PET fibers, improves further the stiffness of the filter medium 1. Furthermore, in the process of integrating the filter medium 1 and a supporting frame into a filter unit, the adhesion between the filter medium 1 and the supporting frame, particularly the supporting frame containing an acrylonitrile-butadiene-styrene copolymer (ABS), is improved. Therefore, peeling of the filter medium from the supporting frame can be reduced. Polyester, particularly PET, has poor adhesion to both materials, PTFE and polyolefin. Although attempts to use gas-permeable supporting members including a PET layer have been made conventionally for the purpose of increasing the stiffness of filter media, such filter media tend to have problems such as peeling and clogging of respective layers included in the filter media. In contrast, according to the present invention, not only is the above-mentioned purpose achieved by the use of the gas-permeable supporting member including a PET layer but also a highly reliable filter medium can be obtained by the placement of the fiber layer 12.

The substrate 11 is, for example, a PET nonwoven fabric.

The substrate 11 may be a liquid repellent-treated (water repellent-treated and/or oil repellent-treated) substrate. In this case, the filter medium 1 has liquid repellency. If the substrate 11 is a liquid repellent-treated substrate, it is easy to wash the filter medium 1 or swing the filter medium 1 mechanically to remove the substances collected in the filter medium 1.

Generally, liquid repellent treatment reduces the adhesion between a liquid repellent-treated layer and the other layers when they are bonded by heat lamination. The filter medium 1, however, has a structure in which the substrate 11 and the fiber layer 12 in the gas-permeable supporting member 3 are bonded to each other by the entanglement of the fibers contained in the fiber layer 12. Therefore, even if the substrate 11 is a liquid repellent-treated one, good adhesion between the substrate 11 and the fiber layer 12 can be maintained.

The fiber layer 12 is not particularly limited as long as it has a structure in which the fibers contained in the fiber layer 12 enter into the substrate 11 and are entangled with the substrate 11 so that they are bonded to each other and the fiber layer 12 contains polyolefin-containing fibers that are bonded to the porous membrane 2. The fiber layer 12 may be, for example, a nonwoven fabric.

The fiber layer 12 may be composed of polyolefin-containing fibers, or may contain fibers other than polyolefin-containing fibers. In either case, all of the polyolefin-containing fibers contained in the fiber layer 12 need not be bonded to the porous PTFE membrane 2.

In the case where the fiber layer 12 is made of polyolefin-containing fibers, the fibers that enter into the substrate 11 and are entangled with the substrate 11 are the polyolefin-containing fibers.

It is preferable that the fibers that enter into the substrate 11 and are entangled with the substrate 11 have a lower melting point than that of a material that composes the substrate 11, regardless of whether or not the fiber layer 12 contains fibers other than the polyolefin-containing fibers. For example, in the case where the porous PTFE membrane 2 and the gas-permeable supporting member 3 are integrated by heat lamination to form the filter medium 1 by an example of the manufacturing method of the present invention to be described later, the above-mentioned fibers that are entangled with the substrate 11 can be welded to the substrate 11 thermally during the heat lamination process. In this case, the adhesion between the substrate 11 and the fiber layer 12 increases further. In this case, the damage to the substrate 11 from the heat generated during the heat lamination is reduced. In the case where the fibers that are entangled with the substrate 11 has a core-sheath structure like PE/PET fibers to be described later, the melting point of these fibers is taken as at least the melting point of the sheath component.

The polyolefin-containing fibers are not particularly limited as long as they are fibers containing polyolefin. For example, the polyolefin-containing fibers are polyethylene (PE) fibers or polypropylene (PP) fibers. The polyolefin-containing fibers may be core-sheath fibers having a polyolefin sheath. Specifically, the polyolefin-containing fibers may be core-sheath fibers having a PE sheath and a PET core (PE/PET fibers). The polyolefin-containing fibers having such a core-sheath structure increases the stiffness of the fiber layer 12 and the filter medium 1. In addition, the polyolefin sheath provides good bonding between the polyolefin-containing fibers and the porous PTFE membrane 2.

From the viewpoint of the bonding to the porous PTFE membrane 2, the polyolefin-containing fibers preferably are PE fibers or PE/PET fibers.

In the case where the substrate 11 is a substrate composed of fibers such as a nonwoven fabric, the relationship between the average fiber diameter of the fibers that compose the substrate 11 and the average fiber diameter of the fibers that compose the fiber layer 12 is not particularly limited. The fibers that compose the fiber layer 12 usually have a smaller average fiber diameter than the fibers that compose the substrate 11.

As the porous PTFE membrane 2, a porous PTFE membrane that is commonly used as a filter medium can be used. As an example, the average pore diameter of the porous PTFE membrane 2 is about 0.01 to 5 µm, the average fiber diameter of the porous PTFE membrane 2 is about 0.01 to 0.3 µm, and the pressure drop of the porous PTFE membrane 2 (pressure drop obtained when air passes through the porous PTFE membrane 2 at a flow rate of 5.3 cm/sec) is about 10 to 300 Pa.

How to bond the porous PTFE membrane 2 and the gas-permeable supporting member 3 (fiber layer 12), that is, how to bond the porous PTFE membrane 2 and the polyolefin-containing fibers, is not particularly limited. For example, they may be bonded to each other by heat welding. The heat welding bonding can be achieved by, for example, heat lamination.

Figure 2:
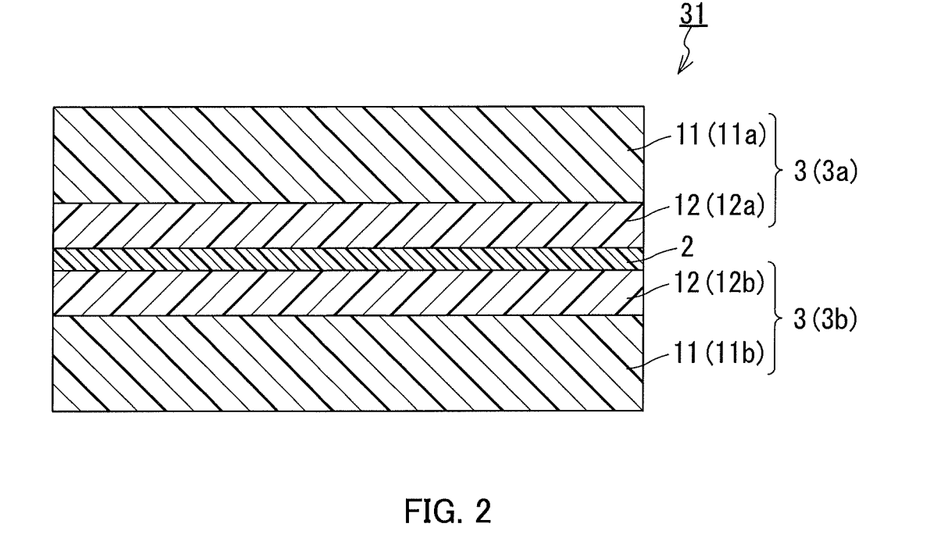
FIG. 2 is a schematic diagram showing another example of a filter medium of the present invention.

FIG. 2 shows another example of a filter medium of the present invention. A filter medium 31 shown in FIG. 2 includes a pair of gas-permeable supporting members 3, and the porous PTFE membrane 2 is sandwiched between the pair of gas-permeable supporting members 3 (3a, 3b). The gas-permeable supporting members 3a and 3b include substrates 11 (11a, 11b) and fiber layers 12 (12a, 12b), respectively, and both of the fiber layers 12a and 12b are bonded to the porous PTFE membrane 2. This structure increases further the stiffness of the filter medium 31 while maintaining good bonding between the respective layers included in the filter medium 31. In the example shown in FIG. 2, both of the substrates 11a and 11b of the gas-permeable supporting members 3a and 3b are the outermost layers of the filter medium 31.

Figure 3:
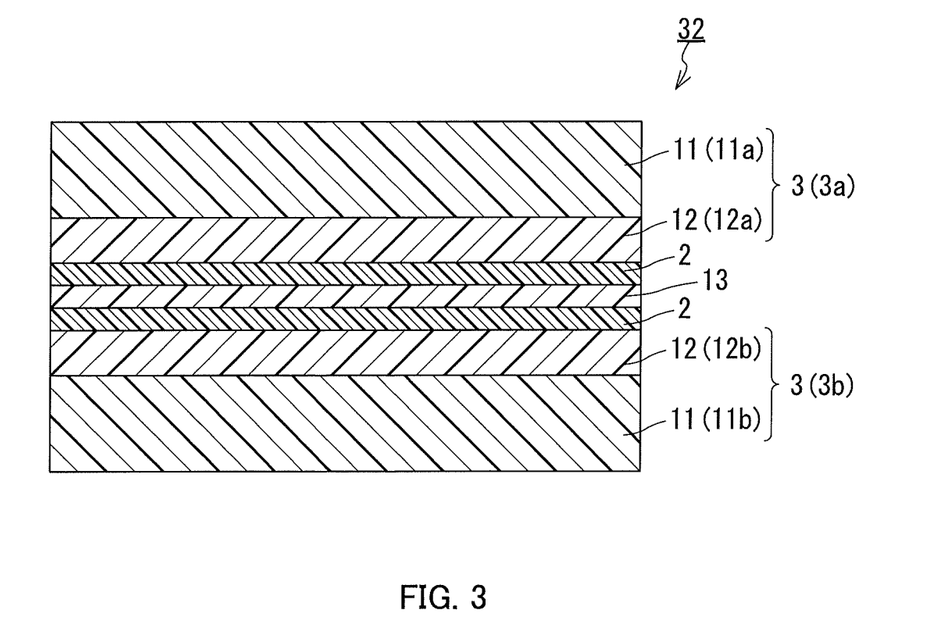
FIG. 3 is a schematic diagram showing still another example of a filter medium of the present invention.

FIG. 3 shows still another example of a filter medium of the present invention. A filter medium 32 shown in FIG. 3 has a structure in which a layer 13 containing olefin-containing fibers is sandwiched between a pair of porous PTFE membranes 2 and this pair of porous PTFE membranes 2 further is sandwiched between a pair of gas-permeable supporting members 3 (3a, 3b). The gas-permeable supporting members 3a and 3b include substrates 11 (11a, 11b) and fiber layers 12 (12a, 12b), respectively, and both of the fiber layers 12a and 12b are bonded to the porous PTFE membranes 2. Such a structure, in which two porous PTFE membranes 2 are present, is expected to increase the collection efficiency further. Furthermore, damages such as a decrease in the collection efficiency are less likely to occur during the pleating process to be described later. Also in the example shown in FIG. 3, both of the substrates 11a and 11b of the gas-permeable supporting members 3a and 3b are the outermost layers of the filter medium 32.

The filter medium of the present invention usually has a collection efficiency of 50% or more when a flow rate of a gas to be filtered is 5.3 cm/sec and diameters of particles to be collected are in a range of 0.3 to 0.5 µm. The choice of the structure of the porous PTFE membrane 2, the materials and structures of the substrate 11 and the fiber layer 12, and the structure of the filter medium allows the collection efficiency to increase to 98% or more, and further to 99.97% or more.

The filter medium of the present invention may have an arbitrary layer in addition to the porous PTFE membrane 2, the substrate 11, and the fiber layer 12, if necessary, and as long as the advantageous effects of the present invention are obtained.

The filter medium of the present invention may be pleated if necessary, and the shape and size of the pleats are not particularly limited. As an example, the height of the pleats is about 10 to 30 mm.

The pleated filter medium can be formed by pleating a flat-shaped filter medium by a known pleating machine (such as a rotary pleating machine, a reciprocating pleating machine, or a striping machine). From the viewpoint of reducing the damage to the porous PTFE membrane 2 during the pleating process as much as possible, a reciprocating pleating machine is used preferably.

In the filter medium of the present invention, the porous PTFE membrane 2, the substrate 11, or the fiber layer 12 may be colored. Each of these layers can be colored by a known method, for example, by kneading a pigment into the material of the layer.

The filter medium of the present invention can be formed, for example, by a manufacturing method of the present invention described below.

Figure 4:
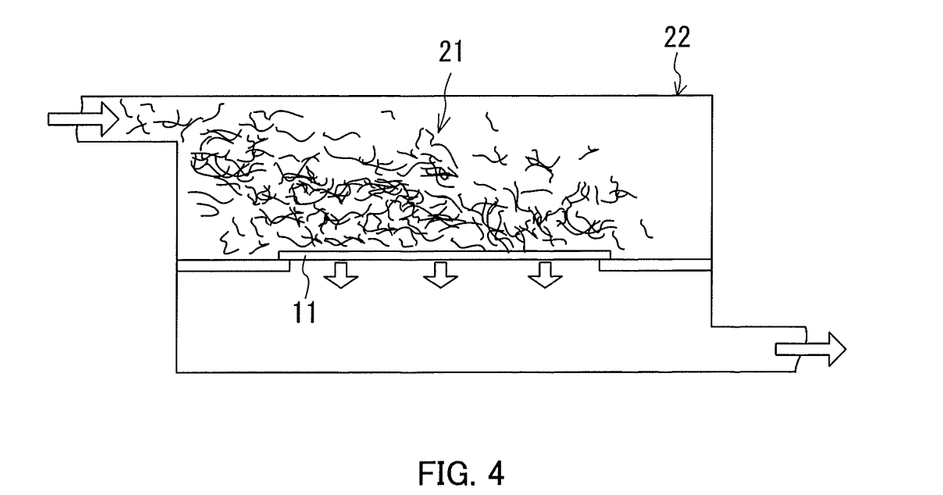
FIG. 4 is a schematic diagram showing a step in an example of a method of manufacturing a filter medium of the present invention.
Figure 5:
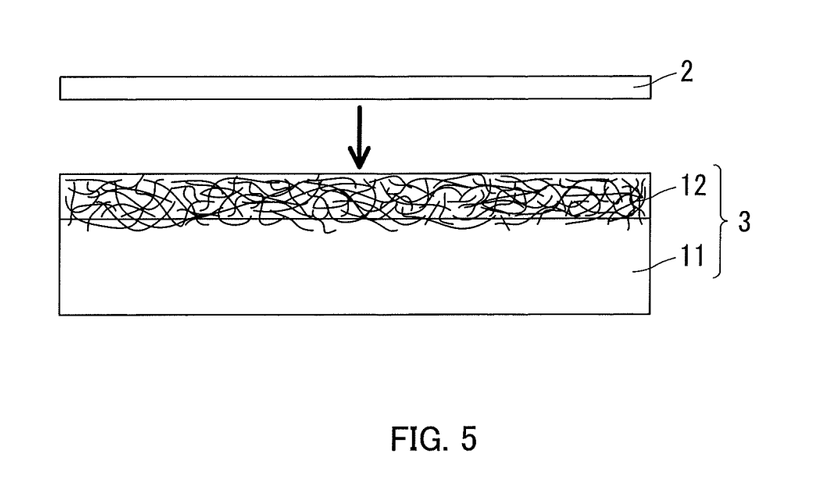
FIG. 5 is a schematic diagram showing a step following the step shown in FIG. 4 in the example of the method of manufacturing a filter medium of the present invention.

FIGS. 4 and 5 show an example of the manufacturing method of the present invention.

First, as shown in FIG. 4, a fiber group 21 containing polyolefin-containing fibers is deposited on the surface of the substrate having gas-permeability by an air-laid process to form a fiber layer (the above-mentioned fiber layer 12 although not shown in this diagram). Air-laid (or air-laying) is a process in which staple fibers are carded and dispersed in air, carried by air flow, and deposited on a carrier to form a fiber layer, and is used, for example, to manufacture non-woven fabrics (see, for example, JP 2006-81779 A, JP 2006-83496 A, JP 2006-83497 A, etc.). During this process, as shown in FIG. 4, the air is drawn through the surface of the substrate 11 opposite to the surface on which the fiber group 21 is to be deposited, that is, through the surface opposite to the surface on which the fiber layer is to be formed. This drawing of the air generates the air flow passing through the substrate 11 in its thickness direction. The fibers of the fiber group 21 are carried by this air flow, enter into the substrate 11, and are entangled with the substrate 11. In this way, the fiber layer that is bonded to the substrate 11 by the entanglement of the fibers contained therein with the substrate 11 is formed. In FIG. 4, the air flow is indicated by arrows.

The fibers of the fiber group deposited on the substrate 11 may be bound to each other by a thermal bonding process or the like. This binding of the deposited fibers is not necessarily required, but this binding improves the handling of the gas-permeable supporting member 3 when it is integrated with the porous PTFE membrane.

Specific conditions of the air-laid process for depositing the fiber layer on the substrate 11 and members necessary to carry out the air-laid process may be the same as those of the typical air-laid process. In the example shown in FIG. 4, the substrate 11 is placed in a chamber 22, in which the fiber group 21 is dispersed and carried by the air flow to form the fiber layer on that substrate 11.

In the air-laid process, the fiber layer also can be formed continuously on a strip-shaped substrate 11. To achieve this, for example, the strip-shaped substrate 11 is supplied continuously into the chamber 22 into which the fiber group 21 is supplied continuously by the air flow.

The fiber group 21 containing fibers having a lower melting point than that of a material that composes the substrate 11 may be deposited on the surface of the substrate 11. In this case, such low melting point fibers are caused to enter into the substrate 11 and become entangled with the substrate 11, and the entangled fibers are welded to the substrate 11 thermally during the process of integrating with the porous PTFE membrane 2 by heat lamination to be described later. As a result, the adhesion between the substrate 11 and the fiber layer can be increased further.

In the case where the substrate 11 is a substrate composed of fibers such as a nonwoven fabric, it is preferable that the fiber group 21 contains fibers having a smaller fiber diameter than the average fiber diameter of the fibers that compose the substrate 11. The fibers contained in the fiber group 21 can be caused to enter into the substrate 11 more reliably, and thereby the above-mentioned fiber layer can be formed more reliably.

The fiber layer also may be formed on the liquid repellent-treated substrate 11. In this case, a filter medium having liquid repellency can be formed.

Next, as shown in FIG. 5, the porous PTFE membrane 2 and the gas-permeable supporting member 3 including the substrate 11 and the fiber layer 12 formed on the substrate 11 are integrated by stacking the porous membrane 2 and the supporting member 3 on each other so that the fiber layer 12 and the porous membrane 2 are brought into contact with each other. Thus, the filter medium of the present invention can be obtained.

A method of integrating the porous PTFE membrane 2 and the gas-permeable supporting member 3 is not particularly limited. They may be integrated by, for example, heat lamination.

Specifically, this heat lamination may be carried out according to a known procedure. For example, the porous PTFE membrane 2 and the gas-permeable supporting member 3 are stacked on each other as described above, and then the resulting stacked body is passed through a pair of heated rolls to be heated and pressed. The temperature of the rolls is, for example, about 130 to 200° C., and the linear pressure applied to the stacked body by the rolls is, for example, 1 to 40 kgf/m.

In the case where the porous PTFE membrane 2 and the gas-permeable supporting member 3 are integrated by heat lamination, the fibers contained in the fiber layer 12 may be bound to each other to convert the fiber layer 12 into a nonwoven fabric depending on the temperature of the heat lamination and the type of the fibers contained in the fiber layer 12.

Conventionally, in the case where a porous PTFE membrane, a PE nonwoven fabric as an adhesive layer, and a PET nonwoven fabric as an gas-permeable supporting member are stacked and integrated by heat lamination to form a filter medium, the heat lamination requires a long time due to poor adhesion between the PE nonwoven fabric and the PET nonwoven fabric. In contrast, according to the manufacturing method of the present invention, the substrate 11 and the fiber layer 12 are bonded to each other mechanically, and the bonding between the fiber layer 12 and the porous PTFE membrane 2 is excellent. Accordingly, the time required for the heat lamination between the porous PTFE membrane 2 and the gas-permeable supporting member 3 can be reduced significantly compared with the time required for the above-mentioned conventional heat lamination.

The porous PTFE membrane 2 can be formed by a known manufacturing method, for example, by a method of stretching a PTFE sheet obtained by extruding a paste of PTFE fine powder as a raw material. In the case where the porous PTFE membrane 2 is formed by this method, the area stretch ratio (a product of a stretch ratio in a uniaxial direction and a stretch ratio in the direction perpendicular to the uniaxial direction) of a PTFE sheet is, for example, 50 to 900. In the case where the porous PTFE membrane 2 is formed by the manufacturing method of the present invention, because of the excellent bonding between the substrate 11 and the fiber layer 12 included in the gas-permeable layer 3, a step of stretching a PTFE sheet and a step of stacking and integrating the porous PTFE membrane 2 obtained by the stretching and the gas-permeable supporting member 3 can be performed sequentially.

The formation of the gas-permeable supporting member 3 and the integration of the porous PTFE membrane 2 and the gas-permeable supporting member 3 may be performed sequentially, or may be performed separately. In the case where these steps are performed separately, when attention is focused on the step of integrating the porous PTFE membrane 2 and the gas-permeable supporting member 3, this step is a step of integrating the porous PTFE membrane 2 and the gas-permeable supporting member 3 including the substrate 11 and the fiber layer 12 placed on the substrate 11 so that the fiber layer 12 and the porous PTFE membrane 2 are in contact with each other. Here, the substrate 11 has gas-permeability, and the fiber layer contains polyolefin-containing fibers that are exposed thereon. The gas-permeable supporting member 3 has a structure in which the fibers of the fiber layer 12 enter into the substrate 11 and are entangled with the substrate 11 so that the fiber layer 12 is bonded to the substrate 11.

In this case, the formation of the gas-permeable supporting member 3 may be performed by the above-mentioned air-laid process. That is, the fiber group 21 containing polyolefin-containing fibers may be deposited on the surface of the substrate 11 by the air-laid process to form the fiber layer 12 and the gas-permeable supporting member 3 having the above structure.

The substrate 11 used in the manufacturing method of the present invention may be the same as the substrate 11 in the above-described filter medium of the present invention. The substrate 11 may be, for example, a nonwoven fabric, or may be composed of polyester fibers. A specific example thereof is a PET nonwoven fabric.

The fiber group 21 to be deposited on the substrate 11 contains the above-mentioned polyolefin-containing fibers. They may be composed of polyolefin-containing fibers. As a more specific example, the fiber group 21 may contain PE fibers or PE/PET fibers. In the case where the fiber group 21 is composed of PE fibers (or PE/PET fibers), the fiber layer 12 composed of PE fibers (or PE/PET fibers) can be formed.

Figure 6:
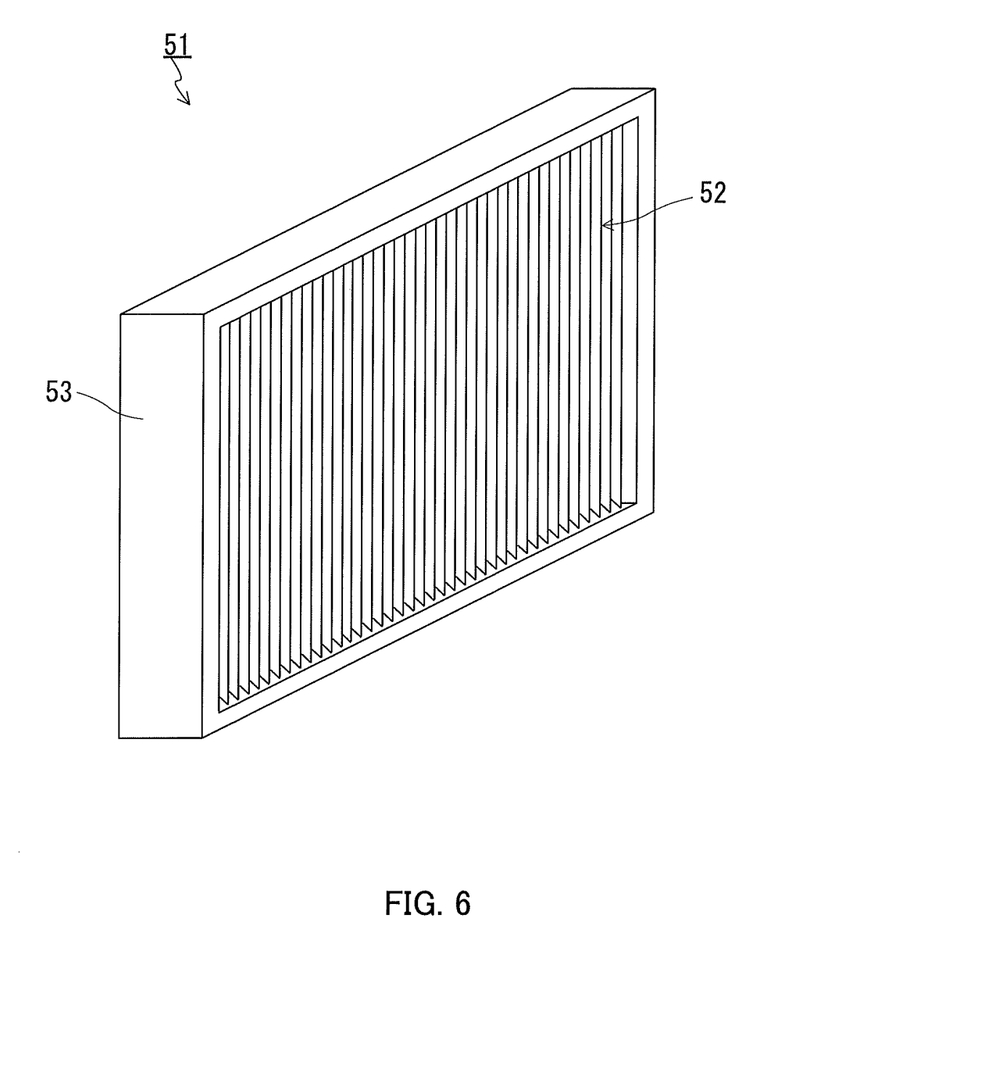
FIG. 6 is a schematic diagram showing an example of a filter unit of the present invention.

FIG. 6 shows an example of the filter unit of the present invention. A filter unit 51 shown in FIG. 6 includes a filter medium 52 for collecting particles included in a gas to be filtered and a supporting frame 53 for supporting the filter medium 52. The filter medium 52 is the above-described filter medium of the present invention (for example, the filter medium 1, 31, or 32). The filter unit 51 has high reliability based on the filter medium 52 of the present invention.

In the example shown in FIG. 6, the filter medium 52 is pleated, but the filter medium 52 does not have to be a pleated one.

Common materials for filter units can be used for the supporting frame 53. Examples of the materials include ABS, polypropylene (PP), polycarbonate (PC), and various types of elastomer resins. It is common to form the supporting frame 53 using ABS or PP, but preferably, the supporting frame 53 contains ABS because the dimensional accuracy of such a frame can be obtained easily and the deformation thereof can be reduced when it is used. Furthermore, since PET and ABS have high adhesion strength (welding strength) to each other, the use of PET for the substrate 11 of the gas-permeable supporting member 3 and the use of ABS for the supporting frame 53 inhibit the peeling of the filter medium 52 from the supporting frame 53 during the process of manufacturing the filter unit 51 and the use thereof.

The supporting frame 53 may contain fibers such as glass fibers. In this case, the dimensional accuracy of the supporting frame 53 is improved further.

The formation of the filter unit 51 is not particularly limited to a specific method. For example, the filter unit 51 can be formed by insert-molding the supporting frame 53 using the filter medium 52.

EXAMPLES

Hereinafter, the present invention is described further in detail using Examples. The present invention is not limited to the following Examples.

Example 1

Preparation of Porous PTFE Membrane

First, 100 parts by weight of PTFE fine powder ("Polyflon F-104" (trade name) manufactured by Daikin Industries, Ltd.) was mixed uniformly with 25 parts by weight of hydrocarbon oil, as a liquid lubricant, ("Isopar M" (trade name) manufactured by Esso Oil Co., Ltd.). Next, the resulting mixture was pre-molded under a pressure of 20 kg/cm$^2$, and then the pre-molded article was molded into a rod by extrusion. This rod thus obtained by extrusion molding further was rolled through a pair of metal rolls to obtain a strip-shaped PTFE sheet of 0.2 mm in thickness and 150 mm in width.

Next, the sheet thus obtained was heated at 220° C. to remove the liquid lubricant contained in the sheet. Then, this unsintered PTFE sheet was stretched in the MD direction (machine direction) by a factor of 20, and then stretched in the TD direction (transverse direction) by a factor of 30. The resulting sheet further was sintered at a temperature of the melting point of PTFE or higher while maintaining the dimensions of the sheet. Thus, a strip-shaped porous PTFE membrane was obtained.

[Preparation of Gas-permeable Supporting Member]

Aside from the preparation of the porous PTFE membrane, a gas-permeable supporting member was prepared in the following manner.

First, a staple fiber group composed of PE/PET fibers (with an average fiber diameter of 10 μm) was deposited by an air-laid process on one of the main surfaces of a substrate made of a PET nonwoven fabric (spunbonded nonwoven fabric with a weight per unit area of 80 g/m$^2$ and an average fiber diameter of 30 μm). The PE/PET stable fiber group was deposited by the air-laid process in the following manner: while the air in a chamber as shown in FIG. 4 was drawn through the surface of the PET nonwoven fabric opposite to the surface on which the staple fiber group was to be deposited, carded staple fiber group was carried by the air flow into the chamber and deposited.

Next, the staple fibers deposited on the substrate were bound to each other by a thermal bonding process. Thus, a gas-permeable supporting member, in which a fiber layer composed of PE/PET fibers was placed on a substrate made of a PET nonwoven fabric, was obtained. The fiber layer was formed to have a weight per unit area of 30 g/m$^2$.

[Preparation of Filter Medium]

The porous PTEF membrane and the gas-permeable supporting member that had been prepared as described above were stacked on each other so that they were in contact with each other, and then they were integrated by heat lamination to obtain a filter medium. This heat lamination was carried out in the following manner: the stacked body of the porous PTFE membrane and the gas-permeable supporting member was passed through a pair of 180° C.-heated rolls (at a line speed of 10 m/min), and then heated and pressed in its stacking direction.

[Evaluation of Prepared Filter Medium]

Figure 7:
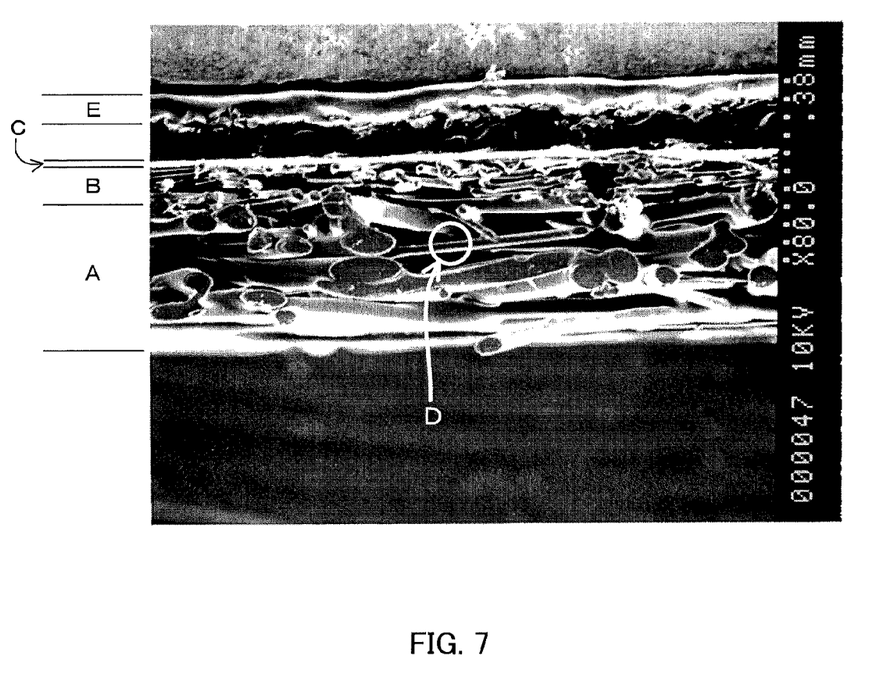
FIG. 7 is a diagram showing a scanning electron microscope (SEM) image of a cross section of a filter medium that was prepared in Example 1.

FIG. 7 shows the result of observation of the cross section of the filter medium obtained as described above through a scanning electron microscope (SEM). As shown in FIG. 7, it was confirmed that in the obtained filter medium, a structure in which a part of the fibers (for example, the fibers shown in an area D of FIG. 7) contained in the fiber layer entered into the PET nonwoven fabric as a substrate and were entangled with the substrate, was formed. The fibers (PE/PET fibers) of the fiber layer were bonded well to the porous PTFE membrane. In FIG. 7, areas A, B and C indicate the PET nonwoven fabric, the fiber layer, and the porous PTFE membrane, respectively. An area E is a layer of an adhesive that was used to fix the filter medium to an observation pedestal when the cross section of the obtained filter medium was observed with the SEM, and is not included in the prepared filter medium.

Aside from the evaluation with the SEM, the bonding strength between the fiber layer and the substrate in the filter medium obtained as described above was evaluated by a 180° peel test. As a result, the bonding strength between them in the MD direction of the porous PTFE membrane was 2.98 N/25 mm, and the bonding strength in the TD direction thereof was 2.91 N/25 mm.

Figure 8:
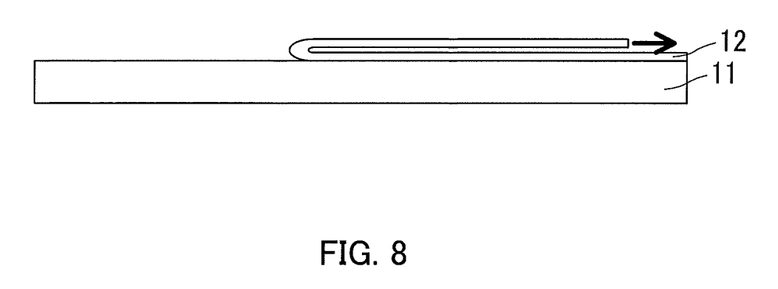
FIG. 8 is a schematic diagram for explaining a 180° peel test that was carried out in Examples.

As shown in FIG. 8, in the 180° peel test, the fiber layer 12 and the porous PTFE membrane (not shown in FIG. 8) were peeled off 100 mm or more from the substrate 11 in the direction parallel to the surface of the substrate 11. The average value of the force required for peeling was converted into a value per width 25 mm of the fiber layer 12, and the obtained value was determined as the bonding strength between the fiber layer and the substrate. The fiber layer 12 was peeled off from the substrate 11 at a constant rate (of 200 mm/min).

[Preparation of Filter Unit]

The filter medium obtained as described above was pleated by a rotary pleating machine so that each pleat had a height of 20 mm. Subsequently, the pleated filter medium and ABS were integrated by insert molding using a vertical type molding machine so that the ABS was formed into a supporting frame. Thus, a filter unit as shown in FIG. 6 was obtained.

Example 2

A filter medium was obtained in the same manner as in Example 1 except that as a substrate of a gas-permeable supporting member, a PET nonwoven fabric that had been dipped in a fluorine water repellent agent (UNIDYNE, manufactured by Daikin Industries, Ltd.) to be imparted with water repellency was used (the same PET nonwoven fabric as that used in Example 1 except that it was a water repellent-treated fabric).

The bonding strength between the fiber layer and the substrate in the obtained filter medium was evaluated in the same manner as in Example 1. As a result, the bonding strength between them in the MD direction of the porous PTFE membrane was 2.75 N/25 mm, and the bonding strength in the TD direction thereof was 2.88 N/25 mm.

Comparative Example 1

A nonwoven fabric (with a weight per unit area of 30 g/m²) of PE/PET fibers (with an average fiber diameter of 15 μm) and a PET nonwoven fabric (with an average fiber diameter of 30 μm and a weight per unit area of 95 g/m²) were stacked in this order on a porous PTFE membrane that had been formed in the same manner as in Example 1, and then the obtained stacked body was passed through a pair of 180° C.-heated rolls (at a line speed of 10 m/min) to be heat-laminated. Thus, a filter medium having a three-layer structure of a porous PTFE membrane, a PE/PET nonwoven fabric, and a PET nonwoven fabric was obtained.

The bonding strength between the PE/PET nonwoven fabric and the PET nonwoven fabric in the obtained filter medium was evaluated by a 180° peel test in the same manner as in Example 1. As a result, the bonding strength between them in the MD direction of the porous PTFE membrane was 0.82 N/25 mm, and the bonding strength in the TD direction thereof was 0.60 N/25 mm.

Comparative Example 2

A filter medium was obtained in the same manner as in Comparative Example 1 except that as a PET nonwoven fabric, a PET nonwoven fabric that had been dipped in a fluorine water repellent agent (UNIDYNE, manufactured by Daikin Industries, Ltd.) to be imparted with water repellency was used (the same PET nonwoven fabric as that used in Comparative Example 1 except that it was a water repellent-treated fabric).

The bonding strength between the PE/PET nonwoven fabric and the PET nonwoven fabric in the obtained filter medium was evaluated by a 180° peel test in the same manner as in Example 1. As a result, the bonding strength between them in the MD direction of the porous PTFE membrane was 0.25 N/25 mm, and the bonding strength in the TD direction thereof was 0.23 N/25 mm.

Table 1 shows collectively the results of the evaluation of the bonding strengths in Examples 1 and 2 and Comparative Examples 1 and 2. In Table 1, the "MD direction" and the "TD direction" are the MD direction and the TD direction of the porous PTFE membrane respectively.

TABLE 1

| | Bonding strength (N/25 mm) | |
|---|---|---|
| | MD direction | TD direction |
| Example 1 | 2.98 | 2.91 |
| Example 2 | 2.75 | 2.88 |
| Com. Example 1 | 0.82 | 0.60 |
| Com. Example 2 | 0.25 | 0.23 |

Examples and Comparative Examples indicated in Table 1 were compared with one another. As a result, the bonding strength between the substrate and the fiber layer in each of the filter media of Examples was at least three times the bonding strength between the nonwoven fabrics in each of the filter media of Comparative Examples. Particularly in the filter medium using a water repellent-treated PET nonwoven fabric in Comparative Example 2, the bonding strength between the nonwoven fabrics was low significantly. A comparison between the filter medium of Comparative Example 2 and each of the filter media of Examples showed that the bonding strength between the substrate and the fiber layer in the filter media of Examples was at least 10 times that of the filter medium of Comparative Example 2.

In the filter medium of Example 2, a water repellent-treated PET nonwoven fabric was used as a substrate as in Comparative Example 2. The bonding strength of this filter medium was, however, slightly lower than that of the filter medium using a PET nonwoven fabric that had not been water repellent-treated (Example 1).

Example 3

A gas-permeable supporting member, in which a fiber layer composed of PE/PET fibers was placed on a substrate made of a PET nonwoven fabric, was obtained in the same manner as in Example 1 except that the weight per unit area of the PET nonwoven fabric was 20 g/m². The fiber layer was formed to have a weight per unit area of 20 g/m².

Next, a pair of the gas-permeable supporting members thus obtained and the porous PTFE membrane prepared in Example 1 were stacked so that the porous PTFE membrane was sandwiched between the gas-permeable supporting members, and then the resulting stacked body was subjected to heat lamination in the same manner as in Example 1. Thus, a filter medium having the structure shown in FIG. 2 was obtained. The porous PTFE membrane and the pair of gas-permeable supporting members were stacked so that the fiber layer of each of the gas-permeable supporting members and the porous PTFE membrane were in contact with each other.

The collection efficiency (that is, a collection efficiency obtained when a flow rate of a gas to be filtered was 5.3 cm/sec and diameters of particles to be collected were in a range of 0.3 to 0.5 μm) of the obtained filter medium was evaluated. As a result, its collection efficiency was 99.9910%. The collection efficiency was evaluated by the following procedure. The filter medium was cut into an appropriate size and set in a circular holder having an effective area of 100 cm². A pressure difference was applied between both sides of the filter medium so that a gas passes through the filter medium, and the linear velocity of the gas passing through the filter medium was adjusted to 5.3 cm/sec. Next, polydisperse dioctyl phthalate (DOP) particles were mixed into the gas at the upstream end of the filter medium so that the concentration of particles with diameters in the range of 0.3 to 0.5 μm was $10^8$ particles per liter, and the concentration of the above DOP particles at the downstream end of the filter medium was measured with a particle counter. The diameters of the particles to be measured with the particle counter were in the range of 0.3 to 0.5 μm. The collection efficiency was calculated from the following equation: Collection efficiency=(1−(DOP particle concentration at the downstream end/DOP particle concentration at the upstream end))×100(%).

Next, the filter medium obtained as described above was pleated by a rotary pleating machine so that each pleat had a height of 22 mm. Subsequently, the pleated filter medium and ABS containing 30% by weight of glass fibers were insert-molded using a vertical type molding machine so that the glass-fiber containing ABS was formed into a supporting frame. Thus, a filter unit shown in FIG. 6 was obtained. The width and height of the filter medium in this filter unit were 191 mm and 27 mm respectively, and the number of pleats within the width was 92. The insert molding was carried out under the following conditions: the injected resin temperature was 275° C., the injection pressure was 8.0 MPa/cm², the cooling temperature and time were 60° C. and 30 seconds respectively, and the pressure keeping was 5%.

The obtained filter unit was inspected visually to find peeling between the filter medium and the supporting frame. As a result, no peeling of the filter medium from the supporting frame was observed. The leakage of the obtained filter unit was evaluated using a method in accordance with JIS B9927 (Test Method for Performance of Air Filters for Clean Rooms), in which a particle collection efficiency (η) of less than 99.97% was determined as "leakage". As a result, leakage was found at two positions.

Example 4

The porous PTEF membrane prepared in Example 1 and the gas-permeable supporting member prepared in Example 3 were stacked on each other so that the fiber layer of the gas-permeable supporting member and the porous PTFE membrane were in contact with each other, and then the resulting stacked body was subjected to heat lamination in the same manner as in Example 1. Thus, an intermediate body A was obtained.

Next, a pair of the intermediate bodies A thus obtained and a spunbonded nonwoven fabric (with a weight per unit area of 30 g/m²) composed of PE/PET fibers were stacked so that the PE/PET nonwoven fabric was sandwiched between the intermediate bodies A, and then the resulting stacked body was subjected to heat lamination in the same manner as in Example 1. Thus, a filter medium having the structure shown in FIG. 3 was obtained. The PE/PET nonwoven fabric and the pair of intermediate bodies A were stacked so that the porous PTFE membrane of each of the intermediate bodies A and the PE/PET nonwoven fabric were in contact with each other.

The collection efficiency (that is, a collection efficiency obtained when a flow rate of a gas to be filtered was 5.3 cm/sec and diameters of particles to be collected were in a range of 0.3 to 0.5 μm) of the obtained filter medium was evaluated in the same manner as in Example 3. As a result, its collection efficiency was 99.9999%.

Next, the filter medium obtained as described above was insert-molded in the same manner as in Example 3, and a filter unit including a supporting frame composed of glass fiber-containing ABS was obtained.

The obtained filter unit was inspected visually in the same manner as in Example 3 to find peeling between the filter medium and the supporting frame. As a result, no peeling of the filter medium from the supporting frame was observed. The leakage of the obtained filter unit was evaluated in the same manner as in Example 3. As a result, no leakage was detected.

Comparative Example 3

Spunbonded nonwoven fabrics (with a weight per unit area of 30 g/m²) composed of PE/PET fibers were prepared as gas-permeable supporting members, and the porous PTFE membrane prepared in Example 1 was sandwiched between the pair of the gas-permeable supporting members. The resulting stacked body was subjected to heat lamination in the same manner as in Example 1. Thus, a filter medium having a layered structure of a PE/PET nonwoven fabric, a porous PTFE membrane, and a PE/PET nonwoven fabric was obtained.

The collection efficiency (that is, a collection efficiency obtained when a flow rate of a gas to be filtered was 5.3 cm/sec and diameters of particles to be collected were in a range of 0.3 to 0.5 μm) of the obtained filter medium was evaluated in the same manner as in Example 3. As a result, its collection efficiency was 99.9950%.

Next, the filter medium obtained as described above was insert-molded in the same manner as in Example 3, and a filter unit including a supporting frame composed of glass fiber-containing ABS was obtained.

The obtained filter unit was evaluated in the same manner as in Example 3 to find peeling between the filter medium and the supporting frame. Peeling of the filter medium from the supporting frame was observed at 98 positions. The leakage of the obtained filter unit was evaluated in the same manner as in Example 3. As a result, the leakage could not be measured due to the peeling of the filter medium from the supporting frame.

The present invention may be embodied in other specific forms without departing the spirit and the essential features thereof. The embodiments disclosed in this description are to be considered in all respects as illustrative and not limiting. The scope of the invention is indicated by the appended claims rather than by the foregoing description, and all changes that come with the meaning and range of equivalency of the claims are intended to be embraced therein.

INDUSTRIAL APPLICABILITY

The filter medium and the filter unit of the present invention can be used in various applications. They can be used, for example, as air filters for clean rooms, filters for masks, and filters used in household appliances in general. The filter medium and the filter unit of the present invention are suitable particularly for use in cyclone vacuum cleaners that are required to withstand a large amount of air.

Furthermore, because of high bonding strength between respective layers included in the filter medium of the present invention, the filter medium and the filter unit of the present invention are suitable for use in filters in which dust and particles collected in the filter medium are removed by shaking and washing during the use thereof.

The invention claimed is:

1. A filter medium, comprising:
a porous polytetrafluoroethylene (PTFE) membrane; and
a gas-permeable supporting member for supporting the porous membrane, the porous membrane and the gas-permeable supporting member being integrated, wherein the gas-permeable supporting member includes:
a substrate having gas-permeability, wherein the substrate is composed of fibers; and
a fiber layer that is placed on the substrate so as to be in contact with the porous membrane, wherein fibers that compose the fiber layer have a smaller average fiber diameter than that of fibers that compose the substrate,
the gas-permeable supporting member has a structure in which fibers of the fiber layer enter into the substrate and are entangled with the substrate so that the fiber layer is bonded to the substrate, and
the fiber layer contains polyolefin-containing fibers that are bonded to the porous membrane.

2. The filter medium according to claim 1, comprising a pair of the gas-permeable supporting members,
wherein the porous membrane is sandwiched between the pair of the gas-permeable supporting members.

3. The filter medium according to claim 1, wherein the fibers that are entangled with the substrate have a lower melting point than that of a material that composes the substrate.

4. The filter medium according to claim 1, wherein the substrate contains polyester fibers.

5. The filter medium according to claim 1, wherein the substrate is a nonwoven fabric made of polyethylene terephthalate (PET).

6. The filter medium according to claim 1, wherein the polyolefin-containing fibers are polyethylene (PE) fibers, or core-sheath fibers having a PE sheath and a PET core.

7. The filter medium according to claim 1, wherein the porous membrane and the polyolefin-containing fibers are bonded to each other by heat welding.

8. The filter medium according to claim 1, wherein the filter medium has a particle collection efficiency of 99.97% or more when a flow rate of a gas to be filtered is 5.3 cm/sec and diameters of particles to be collected are in a range of 0.3 to 0.5 μm.

9. A filter unit comprising: the filter medium according to claim 1; and a supporting frame for supporting the filter medium.

10. The filter unit according to claim 9, wherein the supporting frame contains an acrylonitrile-butadiene-styrene copolymer (ABS).

11. A method of manufacturing the filter medium according to claim 1, the method comprising integrating a porous PTFE membrane and a gas-permeable supporting member including a substrate and a fiber layer placed on the substrate so that the porous PTFE membrane and the fiber layer are in contact with each other, the substrate having gas-permeability, and the fiber layer containing polyolefin-containing fibers that are exposed thereon,
wherein the gas-permeable supporting member has a structure in which fibers of the fiber layer enter into the substrate and are entangled with the substrate so that the fiber layer is bonded to the substrate.

12. The method of manufacturing the filter medium according to claim 11, wherein a fiber group containing polyolefin-containing fibers is deposited on a surface of the substrate by an air-laid process to form the fiber layer and the structure of the gas-permeable supporting member.

13. The method of manufacturing the filter medium according to claim 12, wherein the fiber group containing fibers having a lower melting point than that of a material that composes the substrate is deposited on the surface of the substrate.

14. The method of manufacturing the filter medium according to claim 12, wherein
the substrate is composed of a fiber material, and
the fiber group deposited on the surface of the substrate includes fibers having a smaller fiber diameter than an average fiber diameter of the fiber material.

15. The method of manufacturing the filter medium according to claim 11, wherein the gas-permeable supporting member and the porous PTFE membrane are integrated by heat lamination.

16. The method of manufacturing the filter medium according to claim 11, wherein the substrate contains polyester fibers.

17. The method of manufacturing the filter medium according to claim 11, wherein the substrate is a nonwoven fabric made of PET.

18. The method of manufacturing the filter medium according to claim 11, wherein the polyolefin-containing fibers are polyethylene (PE) fibers, or core-sheath fibers having a PE sheath and a PET core.

* * * * *